United States Patent [19]

Hintermeier et al.

[11] 4,168,145

[45] Sep. 18, 1979

[54] BRANCHED LOW MOLECULAR WEIGHT POLYESTERS LEVELLING AGENTS FOR DYESTUFF

[75] Inventors: Karl Hintermeier; Fritz Engelhardt, both of Frankfurt am Main; Joachim Ribka, Offenbach am Main; Helmut Beutler, Kelkheim, all of Fed. Rep. of Germany

[73] Assignee: Cassella Aktiengesellschaft, Frankfurt, Fed. Rep. of Germany

[21] Appl. No.: 838,293

[22] Filed: Sep. 30, 1977

Related U.S. Application Data

[63] Continuation-in-part of Ser. No. 796,152, May 12, 1977.

[51] Int. Cl.$^2$ ............................ D06P 1/62; D06P 3/52
[52] U.S. Cl. .......................................... 8/173; 528/173; 528/293; 528/294; 528/295
[58] Field of Search .................... 260/49, 75 S; 8/173; 528/173, 293, 294, 295

[56] References Cited

U.S. PATENT DOCUMENTS

| | | | |
|---|---|---|---|
| 3,018,272 | 1/1962 | Griffing et al. | 260/75 |
| 3,033,824 | 5/1962 | Huffman | 260/75 |
| 3,528,947 | 9/1970 | Lappin et al. | 260/75 |
| 3,657,193 | 4/1972 | Caldwell | 260/76 |
| 3,882,185 | 5/1975 | Rudlmann et al. | 260/75 S |

*Primary Examiner*—Lester L. Lee
*Attorney, Agent, or Firm*—Connolly and Hutz

[57] ABSTRACT

Dyeing with disperse dyes is made more uniform when there is used as a levelling agent a branched polyester which has an apparent average molecular weight of from about 600 to about 5,000, disperses itself in water, and is essentially an ester-linked combination of hydrocarbyloxy groups and carboxyl-derived acyl groups, the groups being linked together as a branched chain by the ester linkages and relative to the carboxy-derived acyl groups the polyester contains from about 5 to about 50 mol.% of COOH or COOM groups and less than 5 mol.% of $SO_3M$ groups, wherein M denotes the cation of an alkali metal, the ammonium ion or the cationic radical of an organic amine, the number of branches on an interesterified group being not over three and at least 50 mol.% of the hydrocarbyloxy groups are in diethylene glycol or triethylene glycol groups.

14 Claims, No Drawings

BRANCHED LOW MOLECULAR WEIGHT POLYESTERS LEVELLING AGENTS FOR DYESTUFF

This application is in part a continuation of application Ser. No. 796,152 filed May 12, 1977.

The present invention relates to dyeing with disperse dyes.

Among the objects of the present invention is the provision of improved levelling agents that render such dyeing more uniform, and of improved dyeing compositions and processes thus made possible.

The foregoing as well as additional objects of the present invention are more fully expounded in the following description of several of its exemplifications.

According to the present invention a polyester article is very uniformly dyed with an aqueous dispersion of disperse dye when that dispersion contains as a levelling agent a branched polyester which has an apparent average molecular weight of from about 600 to about 5,000, disperses itself in water and is essentially an ester-linked combination of hydrocarbyloxy groups and carboxyl-derived acyl groups and relative to the carboxyl-derived acyl groups the polyester contains from about 5 to about 50 mol.% of COOH or COOM groups and less than 5 mol.% of $SO_3M$ groups, wherein M denotes the cation of an alkali metal, the ammonium ion or the cationic radical of an organic amine, the number of branches on an interesterified group being not over three and at least 50 mol.% of the hydrocarbyloxy groups are in diethylene glycol or triethylene glycol groups, the groups being linked together as a branched chain by the ester linkages.

The polyester levelling agents of the present invention are built up from interesterified groups of the following formulae

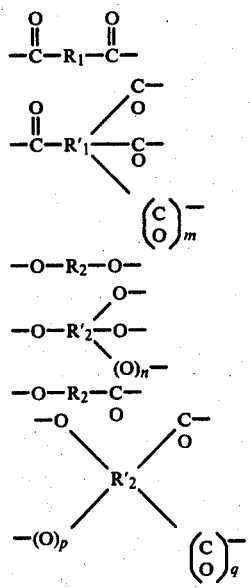

wherein
$R_1$ denotes a direct bond or is essentially a divalent hydrocarbyl (aliphatic, araliphatic or aromatic) radical, preferably having a molecular weight no higher than about 150,
m and n independently denote the number 0, 1 or 2, $R'_1$ is essentially a hydrocarbyl (aliphatic, araliphatic or aromatic) radical which is trivalent if m=0, tetravalent if m=1 and pentavalent if m=2, and also preferably having a molecular weight no higher than about 150, $R_2$ is essentially a hydrocarbyl-oxy-hydrocarbyl radical, preferably aliphatic as in $-CH_2CH_2-O-CH_2-CH_2-$ and $-CH_2-CH_2-O-CH_2CH_2-O-CH_2CH_2-$, and having a molecular weight no higher than about 2000, as well as no more than about 12 carbons between successive oxygen atoms. As much as 20 mol.% of the $R_2$ groups can be oxygen free hydrocarbyl (aliphatic or araliphatic) groups (e.g. ethylene, trimethylene, tetramethylene) without noticeably changing the characteristics of the polyesters, and even a 60 percent oxygen free hydrocarbyl content makes no significant change in those characteristics, p is the number 0, 1, 2 or 3, and
q is the number 0, 1, 2 or 3, whereby p and q are chosen in such a way that the sum,
(p+q) is 1, 2 or 3 and $R'_2$ is essentially a hydrocarbyl (aliphatic or araliphatic) radical which is trivalent if n=0, tetravalent if n=1 and pentavalent if n=2, preferably having a molecular weight no higher than about 150.

Acetylenic unsaturation is not desired in any of the six groups, and neither is more than one olefinically unsaturated bond per group.

It is not necessary to have each of the foregoing six groups in the levelling agent. Thus either or both groups C and $C_1$ can be omitted, as can $B_1$. Groups A and/or B can be omitted if groups C are present, and correspondingly groups $A_1$ and/or $B_1$ can be omitted if groups $C_1$ are present. However all six types of groups can be present, or five, four, three or two, depending upon which are omitted.

Not more than about 20 mol.% of the hydrocarbyl-oxy-hydrocarbyl radicals should have molecular weights from about 300 to about 2000.

The polyester levelling agent of the present invention can contain 0–5 mol percent of $SO_3M$ substituents, based on the total mol number of groups $A+A_1+C+C_1$ contained in the structure of the polyester. The $SO_3M$ substituents can be on any of the groups and represents a sulfo group in the form of its salts with alkali metals, ammonia, amines, and the like.

The polyester levelling agents of the present invention are preferably branched via the radicals $A_1$, but can alternatively or additionally be branched at radicals $B_1$ and/or $C_1$. Inasmuch as branching groups with only one branching or two branchings are preferred, m and n are preferably 0 or 1, and the sum of p+q is preferably 1 or 2.

The COOH or COOM groups are contained in the polyester as terminal groups of dicarboxylic acid units which are interesterified by means of one carboxyl group of such units, or as terminal groups of polycarboxylic acid units which are interesterified through less than all their carboxyl groups.

It is also preferred that the sum of the radicals A and $A_1$, be 80 to 140 mol percent of the sum of the radicals $B+B_1$. The radicals $A_1$ are in a proportion of 5–60 mol percent, preferably 10–40 mol percent, of the sum of the radicals $A+A_1$. The radicals $B_1$ are preferably in an amount up to 10 mol percent of the sum of the radicals B and $B_1$. Preferred radicals $B_1$ are those which contain no more than two —$CH_2$—O— groups.

It is advantageous if at least 40 mol percent, preferably 60 mol percent, of the acyl group containing radicals $A+A_1+C+C_1$ have the formula

($A_2$)

Copolymers according to the invention which are particularly preferred are those in which at least 40 mol percent of the acyl group containing radicals $A+A_1+C+C_1$ have the formula

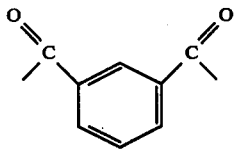

It is advantageous if at least 50 mol percent, preferably at least 80 mol percent, of the radicals $(B+B_1)$ are present as radicals of the formula

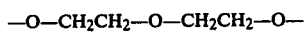

and/or

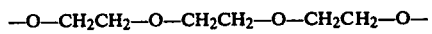

Those polyesters of the present invention which are preferred are those in which divalent open-chained aliphatic $R_2$ radicals contain up to 10 carbon atoms, cycloaliphatic $R_2$ radicals contain 6 to 10 carbon atoms and araliphatic $R_2$ radicals contain 8 to 14 carbon atoms, divalent aliphatic $R_1$ radicals contain 2 to 8 carbon atoms, cycloaliphatic $R_1$ radicals contain 6 to 8 carbon atoms and aromatic $R_1$ radicals contain 6 to 12 carbons atoms.

The polyesters of the present invention can be manufactured by conventional condensation reaction, for example between dicarboxylic acids of the formula

(A')

and diols of the formula

HO—$R_2$—OH  (B')

as well as with one or more components

($A'_1$)

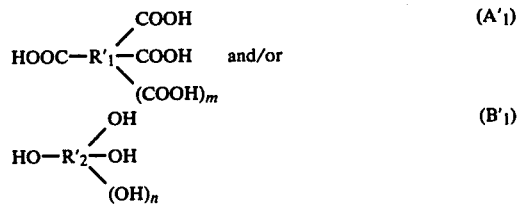
($B'_1$)

which cause branching to also take place during the condensation reaction.

The components are so chosen that a quantity of COOH groups which is more than equivalent to the OH groups is present in the mixtures of the components and, in particular, such a quantity of dicarboxylic, hydroxycarboxylic and polycarboxylic acid is employed that COOH groups are present in an excess of 5 to 50 mol.% and preferably 10 to 30 mol.%, relative to the total mol number of the dicarboxylic, hydroxycarboxylic and polycarboxylic acids $(A'+A'_1+C'+C'_1)$. The proportions of the other ingredients are similarly computed from the number of groups desired.

It is preferable to employ diol components B' in which aliphatic $R_2$ radicals contain 2 to 10 carbon atoms and araliphatic $R_2$ radicals contain 8 to 14 carbon atoms.

Instead of reacting the carboxylic acids, it is also possible to employ their esters, especially those with readily volatile lower alcohols of 1 to 4 carbon atoms, and also anhydrides or acid halides of the acids.

The condensation reaction is carried out as usual at an elevated temperature of 100°–280° C., especially 150°–230° C., preferably under an atmosphere of an inert gas, such as, for example, nitrogen or carbon dioxide, and the volatile products of the condensation reaction (e.g. water and/or alcohols) as well as, where appropriate, excess starting products, usually a diol, are distilled off. It can be appropriate to apply a vacuum of, for example, 10 to 15 mm Hg or, if appropriate, even lower (e.g. 0.5 mm Hg) towards the end of the condensation reaction, in order to more effectively remove the volatile products.

The condensation reaction normally lasts 3 to 15 hours and is carried on until the desired molecular weight has been reached. Care is taken to ensure that significant cross-linking of the polyester does not take place as the result of a condensation reaction having been carried too far, since the products then become water-insoluble and unsuitable for the present invention.

In the condensation reaction it is possible for all the components used to be subjected to the polycondensation reaction from the start, that is to say they can be initially charged. They can also, however, be added at intervals of time in any desired sequence, so that the fractions which are first added can form precondensates. In particular, it is advisable not to add components which cause branching until later. Components which can cause considerable branching, such as, for example, pentaerythritol, are appropriately added only at a relatively late point in the reaction.

The polycondensation reaction can be carried out both with the customary esterification or trans-esterification catalysts (alkali metal alcoholates, titanium alcoholates, manganese acetate, zinc acetate and the like) and also entirely in the absence of such catalysts. Both types of condensation can have their particular advantages in an individual case and, depending on the choice, can yield products of a different kind, principally in respect of molecular weight and solubility.

Examples of trans-esterification catalysts which can be used include alkali metal hydroxides such as sodium hydroxide or potassium hydroxide, alkali metal alcoholates such as sodium methylate or ethylate, alkaline earth metal oxides or hydroxides such as for example the corresponding calcium or magnesium compounds, zinc oxide or cadmium oxide, salts of organic carboxylic acids such as sodium acetate or formate, calcium acetate or formate, or zinc acetate or formate, and organic titanium compounds, especially the titanium alcoholates, such as, for example, titanium isopropylate or titanium butylate and others. The quantities to be used depend, above all, on the activity of the particular catalyst. The quantity of catalyst is normally kept as small as possible, e.g. from about 0.01 to about 3% by weight of all reactants.

Reactants such as one or more hydroxycarboxylic acids of the formula

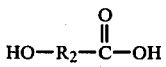  (C')

or the esters thereof, as well as one or more branching components of the formula $C'_1$

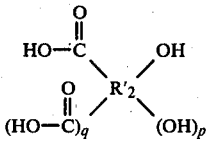  ($C'_1$)

or the esters thereof can be present in the interesterification mixture in addition to, or in place of, reactants A', $A'_1$, B' and $B'_1$.

The apparent average molecular weight of the interesterified products is determined in known manner in a vapor pressure osmometer, using dimethylformamide as the solvent. Owing to the dissociation of the acid groups or their salts, the actual average of the molecular weight is higher than the average value thus measured. The value measured is, however, an adequately precise criterion for the characterization of the degree of condensation of the copolyesters according to the invention and for the determination of the end point of the condensation reaction.

If, in carrying out the copolycondensation reaction, reactants containing a $-SO_3M$ group are employed, there are directly produced according to the present invention, polyesters which contain $-SO_3M$ groups. It is, however, also possible to introduce $-SO_3M$ groups into a previously interesterified branched and unsaturated polyester which contains a quantity of olefinic C—C double bonds equal to the number of $-SO_3M$ groups to be introduced. For this purpose a branched and unsaturated polyester that can be free of $-SO_3M$ groups can first be prepared so as to contain a total of less than 5 mol percent olefinic double bonds based on all the interesterifying reactants. It is preferable to select reactants which contain not more than one olefinic double bond.

Suitable reactants having unsaturated C—C bonds are, in particular, maleic acid, fumaric acid and itaconic acid as well as their lower esters and anhydrides.

A quantity of a $HSO_3M$ solution, especially a $HSO_3Na$ solution, which is equivalent to the unsaturated C—C bonds present in the polyester is now added, at an elevated temperature of 50° to 100° C., preferably 90° to 100° C., to the branched and unsaturated polyester thus prepared. Copolyesters which contain $-SO_3M$ groups according to the present invention are obtained as a result of the addition of the $H-SO_3M$ to the unsaturated C—C bonds.

Dicarboxylic acid components which can be used for the preparation of the copolyesters according to the invention are primarily all the dicarboxylic acids A' or the corresponding acid halides, anhydrides or esters which are suitable for the preparation of polyesters and which incorporate into the final polyester the radical

  (A)

wherein $R_1$ represents a direct bond or a divalent, aliphatic, araliphatic or aromatic radical, some of which can as pointed out above carry a $SO_3M$ group. $R_1$ preferably denotes a divalent open-chained aliphatic radical having 2 to 8 carbon atoms, a divalent cycloaliphatic radical having 6 to 8 carbon atoms, or a divalent aromatic radical having 6 to 12 carbon atoms. Examples of suitable aliphatic and aromatic dicarboxylic acids are: oxalic acid, malonic acid, succinic acid, methylmalonic acid, glutaric acid, dimethylmalonic acid, adipic acid, pimelic acid, suberic acid, 2,2-dimethylglutaric acid, azelaic acid, trimethyladipic acid, sebacic acid, fumaric acid, maleic acid, itaconic acid, 1,2-cyclohexane-dicarboxylic acid, 1,3-cyclohexane-dicarboxylic acid, 1,4-cyclohexane-dicarboxylic acid, norbornane-dicarboxylic acid, phthalic acid, isophthalic acid, terephthalic acid, 1,4-naphthalene-dicarboxylic acid, 2,5-naphthalene-dicarboxylic acid and diphenic acid. The carbon skeleton of the suitable dicarboxylic acids can also be interrupted by hetero-atoms, such as oxygen or sulphur, or hetero-groups, such as $-SO_2-$. Examples of these are diglycollic acid, thiodipropionic acid, 4,4'-oxydibenzoic acid or 4,4'-sulphonyldibenzoic acid.

As already mentioned, the said dicarboxylic acids can also be employed in the form of their esters, anhydrides or acid halides. The preferred acid halides are acid chlorides. Preferred esters are those with monoalcohols which can readily be distilled off, that is to say with 1 to 4 carbon atoms. On the other hand, esters with diols are also suitable. The following are examples of esters, anhydrides and acid chlorides which are suitable for the component A' or for the incorporation of A: terephthalic acid dimethyl ester, terephthalic acid diethyl ester, terephthalic acid dipropyl ester, terephthalic acid di-isopropyl ester, terephthalic acid dibutyl ester, isophthalic acid dimethyl ester, isophthalic acid diethyl ester, isophthalic acid dipropyl ester, isophthalic acid dibutyl ester, isophthalic acid di-isobutyl ester, phthalic acid dimethyl ester, phthalic acid diethyl ester, phthalic acid dipropyl ester, phthalic acid di-isopropyl ester, phthalic acid dibutyl ester, malonic acid dimethyl, diethyl, dipropyl or dibutyl ester, succinic acid dimethyl or dibutyl ester, glutaric acid diethyl or di-isopropyl ester, adipic acid diethyl or di-isobutyl ester, pimelic acid dimethyl, di-isopropyl or dibutyl ester, suberic acid dimethyl, diethyl, dipropyl or dibutyl ester, 1,4-cyclohexane-dicarboxylic acid dimethyl, diethyl, dipropyl or dibutyl ester, 1,2-cyclohexane-dicarboxylic acid dimethyl, diethyl, dipropyl or dibutyl ester, 1,3-cyclohexane-dicarboxylic acid dimethyl, diethyl, dipropyl or dibutyl ester, phthalic anhydride, maleic anhydride, succinic anhydride or phthalyl chloride.

The polyester levelling agents of the present invention preferably contain at least 40 mol percent of radicals of the formula

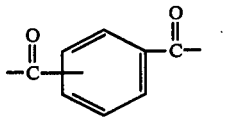
(A₂)

relative to the sum of present radicals A+A₁+C+C₁. This means that it is appropriate, when using component A' in preparing the copolyester, to employ at least 40 mol percent, relative to the component A', of a benzenedicarboxylic acid of the formula

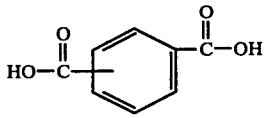
(A'₂)

that is to say phthalic acid, isophthalic acid or terephthalic acid or esters, anhydrides (in so far as they exist), or acid chlorides thereof. Particularly good results are obtained if the A₂ radicals have the formula

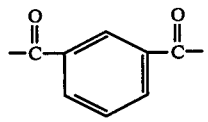
(A₃)

It is particularly appropriate, when using A' in preparing the copolyester, to employ at least 40 mol percent, relative to the total A', of isophthalic acid or an ester thereof, in particular isophthalic acid dimethyl ester, or mixtures of two or three benzenedicarboxylic acids which predominantly contain isophthalic acid or esters thereof.

Diol components which can be used for the preparation of the copolyesters according to the invention are primarily all the diols B':

HO—R₂—OH          (B')

which are suitable for polyester manufacture and which incorporate into the final polyester the radical

—O—R₂—O—          (B)

wherein R₂ is preferably the divalent radical of diethylene glycol and/or triethylene glycol or of a polyethylene glycol or an ethylene-propylene polyglycol of molecular weight up to 2000. Up to about 60 mol.%, and preferably only up to about 20 mol.% of the R₂ radicals can also be hydrocarbyl radicals, such divalent cycloaliphatic radicals having 6 to 10 carbon atoms, or divalent araliphatic radicals having 8 to 14 carbon atoms, and can be hydrocarbyl or hydrocarbyl-oxy-hydrocarbyl radicals having 2 to 10 carbon atoms and modified as by the presence of a thio or sulfone bridge. Generally, different individual diol components are used as a mixture which contains as a statistical average 40 to 100 mol.%, preferably 80 to 100 mol.% of the radicals —CH₂—CH₂—O—CH₂—CH₂—CH₂— and/or

—CH₂—CH₂—O—CH₂—CH₂—O—CH₂—CH₂—

0 to 20 mol.%, preferably 5 to 20 mol.%, of radicals of polyethylene glycol having an average molecular weight of 300 to 2000.

The following are examples of suitable diols B' which supply the radical R₂: ethylene glycol, propane-1,2-diol and propane-1,3-diol, butanediols, especially butane-1,4-diol, pentanediols, such as pentane-1,5-diol, hexanediols, especially hexane-1,6-diol, decane-1,10-diol, diethylene glycol, dipropylene glycol, triethylene glycol, tetraethylene glycol, tripropylene glycol, polyethylene glycol of molecular weight 300–2,000, bis-(4-hydroxybutyl)-ether, 2-methylenepropane-1,3-diol, 2,4-dimethyl-2-ethyl-hexane-1,3-diol, 2-ethyl-2-butyl-propane-1,3-diol, 2,2-dimethyl-propane-1,3-diol, 2-ethyl-2-isobutyl-propane-1,3-diol, 2,2,4-trimethyl-hexane-1,6-diol, 1,3-dihydroxy-cyclohexane, 1,4-dihydroxy-cyclohexane (quinitol), 1,4-bis-(hydroxymethyl)-cyclohexane, 1,3-bis-(hydroxymethyl)-cyclohexane, 1,2-bis-(hydroxymethyl)-cyclohexane, 1,4-bis-(hydroxymethyl)-benzene, 1,3-bis-(hydroxymethyl)-benzene and 2,6-bis-(hydroxymethyl)-naphthalene.

Further examples of suitable components B' are araliphatic bis-hydroxy compounds which have been obtained by reacting diphenols with 2s mols of ethylene oxide to form compounds having the general formula B'₂

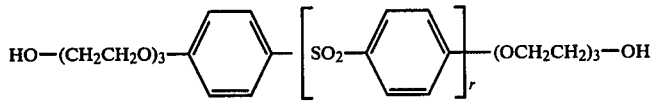
(B'₂)

wherein r is 0 or 1 and s is 1, 2, 3 or 4. Such compound contributes to the interesterified product the radical B₂

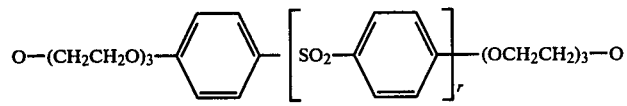
(B₂)

wherein r and s have the meaning mentioned. In calculating the mol percentages B₂ is included with the radicals B, and B'₂ is included with the components B', respectively. The following are examples of suitable components B'₂:

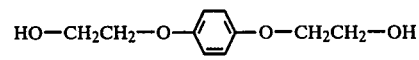

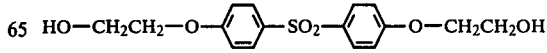

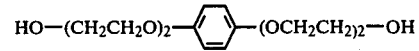

-continued

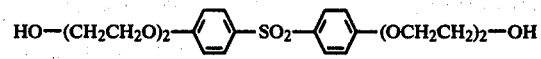

and also other products which are polyoxyethylated on both sides.

The following are examples of suitable hydroxycarboxylic acids C' which supply the radical C: glycollic acid, lactic acid, 3-hydroxypropionic acid, 4-hydroxybutyric acid, 5-hydroxypenten-3-oic acid, mandelic acid, 3-hydroxymethyl-cyclohexane-carboxylic acid, 4-hydroxymethyl-cyclohexanecarboxylic acid, 6-hydroxymethyl-decalin-2-carboxylic acid,

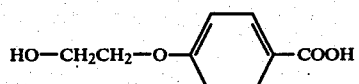

and

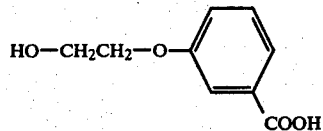

The following should be mentioned as examples of suitable esters of hydroxycarboxylic acids C': lactic acid methyl ester, lactic acid ethyl ester, 4-hydroxybutyric acid methyl ester, mandelic acid ethyl ester,

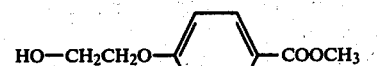

and

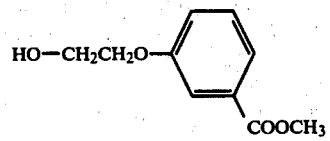

The radicals $A_2$, $A_3$ and $B_2$ can also contain a $SO_3M$ substituent.

The following are examples of suitable compounds A', $A'_2$ and $A'_3$, or esters, anhydrides or acid chlorides thereof, which carry $SO_3M$: sodium sulphosuccinic acid, potassium sulphosuccinic acid, ammonium sulphosuccinic acid, 4-sodium-sulphophthalic acid, 4-sodium-sulphophthalic anhydride, 4-potassium-sulphophthalic acid, 2-sodium-sulphoterephthalic acid, 2-sodium-sulphoterephthalic acid dichloride, 5-sodium-sulphoisophthalic acid, 5-sodium-sulphopropoxy-isophthalic acid, 5-sodium-sulphoethoxy-isophthalic acid, sodium sulphosuccinic acid dimethyl ester, sodium sulphosuccinic acid diethyl ester, 4-sodium-sulphophthalic acid diethyl ester, 4-sodium-sulphophthalic acid dimethyl ester, 4-ammonium-sulphophthalic acid dimethyl ester, 2-sodium-sulphoterephthalic acid diethyl ester, 5-sodium-sulphoisophthalic acid dimethyl ester, 5-sodium-sulphopropoxy-isophthalic acid dimethyl ester, 5-sodium-sulphoethoxy-isophthalic acid diethyl ester, 5-sodium-sulphoethoxy-isophthalic acid diisopropyl ester, 5-potassium-sulphoethoxy-isophthalic acid di-n-propyl ester,

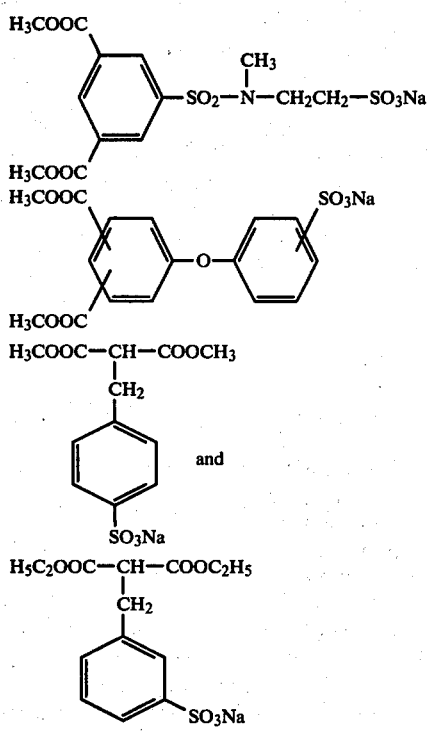

The following should be mentioned as examples of hydroxycarboxylic acids C', or esters thereof, which carry $SO_3M$ groups:

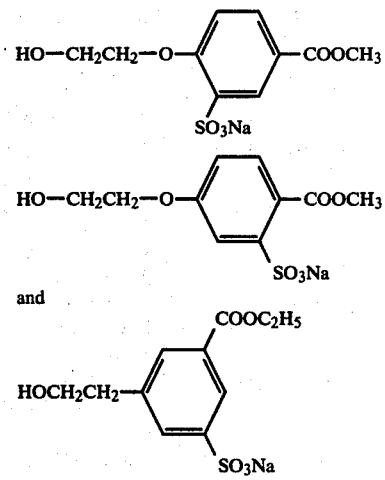

The following are examples of compounds B' which carry $SO_3M$ groups:

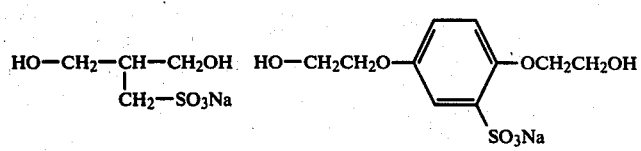

and

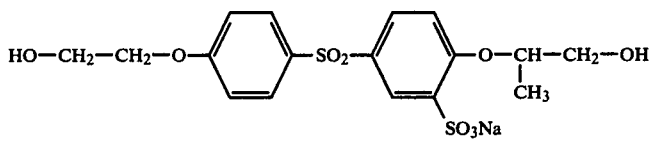

It is apparent from the examples mentioned that the SO₃M group can be linked either directly or indirectly, for example via radicals such as —OCH₂CH₂—, —O—CH₂CH₂CH₂— or

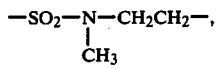

to the real carbon skeleton of the molecule of the compounds A', A'₁, A'₂, A'₃, C', C'₁ and B'.

It is necessary for the manufacture of the branched copolyesters of the present invention to utilize components by means of which a branching is incorporated into the copolyester.

Branching components of this type can be:

(a) The polycarboxylic acids A'₁ which have 3, 4 or 5, preferably 3, carboxyl groups, or esters thereof, especially those with lower alcohols having 1 to 4 C atoms, anhydrides thereof or acid chlorides thereof, (b) the polyhydroxy compounds B'₁ which have 3, 4 or 5, preferably 3, hydroxyl groups, and (c) the hydroxycarboxylic acids C'₁ which have up to 3 hydroxyl or up to three carboxylic acid groups.

The polycarboxylic acids A'₁ mentioned under (a) which have 3, 4 or 5, preferably 3 or 4, carboxyl groups can also carry a SO₃M group. Compounds of the formula A'₁ introduce the radical A₁ into the copolyester molecule, and the number of the branchings thus incorporated into the copolyester molecule by means of radical A₁ being m+1.

The following examples of suitable compounds A'₁ which incorporate the group A₁ into the copolyester molecule: trimellitic acid, trimesic acid, hemimellitic acid, mellophanic acid, prehnitic acid, pyromellitic acid, aconitic acid, tricarballylic acid and ethanetetracarboxylic acid. Suitable anhydrides are for example: trimellitic anhydride, pyromellitic dianhydride, hemimellitic anhydride, mellophanic dianhydride and prehnitic anhydride. Suitable esters are those with alcohols having 1 to 4 C atoms, such as, for example: trimellitic acid trimethyl ester, trimellitic acid triethyl ester, trimesic acid trimethyl ester, hemimellitic acid trimethyl ester, mellophanic acid tetramethyl ester, prehnitic acid tetramethyl ester, pyromellitic acid tetramethyl ester and pyromellitic acid tetraethyl ester.

The following are also suitable A'₁ compounds: 1,2,3-cyclohexanetricarboxylic acid, 1,2,4-cyclohexanetricarboxylic acid, 1,3,5-cyclohexanetricarboxylic acid and naphthalenetricarboxylic acids.

The polyhydroxy compounds B'₁ mentioned in the preceding text under (b) which have 3, 4 or 5, preferably 3 or 4, hydroxyl groups, can also contain a SO₃M group. The number of the branchings which are incorporated into the copolyester molecule by means of a compound B'₁, is n+1.

The following are examples of suitable compounds B'₁: glycerol, erythritol, pentaerythritol, trimethylolpropane and trimethylolethane.

Compounds B'₁ in which n is 0 or 1 and which, accordingly, contain three or four hydroxyl groups in the molecule are particularly desirable inasmuch as they introduce less risk during the manufacture of the copolyester, of an overdosing which could product cross-linking to give insoluble products. This desirability for only one or two branches in the components, also applies to reactants A'₁ and C'₁.

The number of the branchings which are incorporated into the copolyester molecule by means of a compound C'₁, is q+p. Examples of suitable compounds C'₁ are: citric acid, malic acid and tartaric acid.

Instead of the free hydroxycarboxylic acids of the formula C'₁, it is also possible to employ corresponding derivatives, in particular the corresponding esters with lower alcohols, that is to say having 1 to 4 C atoms, for example: citric acid trimethyl ester, malic acid dimethyl ester and tartaric acid dimethyl ester.

For the manufacture of the copolyesters, 80–140 mol percent of the polycarboxylic acid component consisting of the compounds A' and A'₁ are normally employed, relative to 100 mol percent of the polyol component consisting of the compounds B' and B'₁ (any compounds B'₂ present are included with the compounds B'), and the components are so chosen that, relative to 100 mol percent of the polycarboxylic acid component (A'+A'₁), up to 5 mol percent of SO₃M groups are present, or, if the SO₃M groups are introduced by an addition reaction with a finished SO₃M free copolyester, up to 5 mol percent of unsaturated C—C bonds are present. Normally, 1 to 40 mol percent, preferably 5 to 40 mol percent, of branching components (A'₁+B'₁) are employed, relative to 100 mol percent of a polycarboxylic acid component (A'+A'₁). At least 40 mol percent of the compounds A' advantageously consist of benzenedicarboxylic acids A'₂ and, in particular, of isophthalic acid A'₃. It is furthermore advantageous if the compounds of the polyol component consisting of the components B'+B'₁ are so chosen that at least 40 mol percent of diethylene glycol and/or triethylene glycol are employed, relative to 100 mol percent of (B'+B'₁).

When hydroxycarboxylic acids C' or C'₁ are employed in the manufacture of the copolyester, half of such reactants are considered equivalent to reactants A' or A'₁ and the other half equivalent to reactants B' or B'₁.

One representative or several representatives of each of the components A', A'₁, A'₂, A'₃, B', B'₁, B'₂, C' and C'₁ can be employed for the manufacture of the copolyesters.

The copolyesters of the present invention are not only outstandingly suitable as levelling auxiliaries in polyester dyeing, particularly for rapid dyeing processes, but they are also suitable as hair setting lotions, as sizes for paper and the like, as water-soluble adhesives, as additives for adhesives, and as modifying agents for melamine-formaldehyde resins or other aminoplast resins even where those resins are used to provide hard or weather-resistant surfaces.

Aliphatically linked $SO_3M$ groups, especially $SO_3Na$ groups, in the condensates of the present invention effect a significantly stronger improvement on the solubility of the condensate in water than do aromatically linked $SO_3M$ groups. Moreover, isophthalic acid or aliphatic dicarboxylic acids have a favorable effect on the solubility in water, but terephthalic acid has an unfavourable effect. Diols and polyols containing ether groups also have a favorable effect on the solubility in water, but simple diols on the other hand have an unfavorable effect. The desired properties of the condensate can be adjusted by varying the quantity and the nature of the individual components.

The condensates of the present invention have a real or colloidal solubility in water or can be dispersed easily in water without the use of dispersing agents or the like. However these condensates can be dissolved or dispersed in other solvents and used in that form, particularly in mixtures of water with other solvents, preferably alcohols such as methanol or ethanol, or dipolar aprotic solvents such as dimethylformamide or dimethylsulphoxide. Condensates with a low degree of branching, are particularly desirable sizing agents and levelling auxiliaries for polyester dyeing with disperse dyes. Products with a greater degree of branching are particularly suitable as modifying agents for melamine resins if they are branched via polyalcohols, that is to say via the radical $B_1$; if they are branched via polycarboxylic acids, that is to say via the radical $A_1$, they are then particularly suitable for the manufacture of hair setting lotions.

The copolyesters as generally produced have a pH value of 2 to 5, so that it is frequently appropriate to increase the pH value to pH 6 to 7 by stirring in an aqueous solution of an anorganic or organic base, such as sodium or potassium hydroxide, ammonia, diethylamine, triethylamine, triethanolamine, etc., whereby most or all of the COOH groups present are converted to COOM groups.

When used as levelling auxiliaries in polyester dyeing, the water-soluble copolyesters of the present invention display a certain partial carrier action. It appears that a reversible addition reaction takes place between the disperse dyes and the molecules of the auxiliary, and this reaction is outweighed in favor of the final absorption of the dyes onto the polyester article being dyed. As a result the dye is brought up very uniformly and with a certain degree of delay to the fiber and thus produces extremely level dyeings. It is surprising in this mode of action that there is no retention of the dyes on the auxiliary and that full depths of color are obtained. Moreover it is not necessary to prolong the dyeing time.

A further surprising mode of action of the copolymers of the present invention makes it possible to employ disperse dyes which have been inadequately reduced in particle size. In the course of the dyeing with these levelling agents, the optimum fine distribution which is necessary for the best dyeing is produced by the levelling agent—even in dyeing liquor which has been heated to over 100° C.—and an extremely high stability of the dyeing liquors is achieved. The harmful tendency to crystallization which is often observed with disperse dyes, is also reduced or eliminated, so that it is possible to prevent deposition of the dyes and irregular dye deposits on the material to be dyed.

All these factors together lead to an increase in the tinctorial yield which could not have been foreseen. When using the copolyesters of the present invention as levelling auxiliaries it has become possible even for dyes which by virtue of their individual properties could not have been employed, for example, for dyeing wound yarn packages, to be used for these purposes. The use of less expensively prepared dyes is thus possible in many cases.

A further considerable advantage arises for the rapid dyeing processes which are universally desirable.

The effect of the copolyesters of the present invention is to match to one another the absorption curves of the disperse dyes employed. This means that, with combinations of three or even four dyes, it is not necessary to make allowances in respect of the individual absorption phases. Although a retarding effect on the dyeing cannot be established with high temperature dyeings and also with dyeings at 100° C., the absorption rate of the dyes in the rapid dyeing technique is certainly lowered. In these processes large quantities of dye are suddently presented to polyester fibers at 120° to 130° at specific places in the dyeing vessel, and this can produce dyeing unevenness. In this case a reduced dye absorption rate is advantageous, since it produces even dyeings.

For dyeing, the dyebaths are made up at 50°-60° C. in the customary manner, adjusted to pH 5-6 by means of substances which regulate the pH and the appropriate condensate of the present invention is added in quantities of 0.1-5 g/l. After the pre-dispersed, water-insoluble disperse dye has been added, the bath is heated up to the required dyeing temperature and dyeing is carried out for the customary dyeing time. The dyeings are finished in the customary manner, for example by means of a reductive after-scouring. A subsequent dry heat treatment or other measures for the removal of residual condensate are not needed since no significant amount of these remains on the goods. For this reason the fastness to light of the dyeing is also not harmfully affected.

In the rapid dyeing processes, the dyeing liquors are also brought to the required dyeing temperature of 120°-130° C., with the addition of the quantities of the levelling agents according to the invention, separately from the material to be dyed. They are then allowed to flow very rapidly into the dyeing apparatus containing the material to be dyed and are thus brought into rapid contact with the fibre. In the course thereof the dyestuff is fixed in an absolutely level manner. Different dyestuff absorption properties are assimilated to one another by means of the levelling agents of the invention. When dyeing by the injection technique, it is, of course, readily possible to add the levelling agents according to the invention to the dyebath before the addition of the dyestuff dispersion.

The following abbreviations are used in the example below:

IPA = isophthalic acid
DMI = isophthalic acid dimethyl ester
DMT = terephthalic acid dimethyl ester
SIM = 5-sodium-sulphonato-isophthalic acid dimethyl ester
K-SIM = 5-potassium-sulphonato-isophthalic acid dimethyl ester SPO = 5-sodium-sulphonatopropoxy-isophthalic acid dimethyl ester
TPA = terephthalic acid
TMA = trimellitic anhydride
MA = maleic anhydride
DEG = diethylene glycol
TEG = triethylene glycol
TMP = trimethylolpropane
TME = trimethylolethane
PEG = polyethylene glycol
MW = apparent average molecular weight
BA = succinic anhydride
PMSA = pyromellitic dianhydride The temperatures are in °C.; unless otherwise specified, the percentages are percentages by weight.

EXAMPLE 1

80 mol percent of IPA; 20 mol percent of TMA; 90 mol percent of DEG; 10 mol percent of PEG (having a molecular weight about 600);

238.5 g (2.25 mols) of diethylene glycol, 150 g (0.25 mol) of polyethylene glycol 600 and 332 g (2 mols) of isophthalic acid of a purity of at least 99% are heated to 160° in the course of one hour, under nitrogen and without the addition of a catalyst, in a 4-liter four-necked flask with ground joints, equipped with a stirrer, a thermometer, a gas inlet tube for nitrogen and a descending condenser. The temperature in the flask is then raised, in the course of 3 hours at 20° per hour, up to 220°. Heating is then continued for 2 hours at 220°–225°, after which a total of about 52–55 g of water had been distilled off. The internal temperature is now reduced to 150° and 96 g (0.5 mol) of trimellitic anhydride are stirred in in portions in the course of half an hour, while continuing to pass nitrogen over the surface. The contents of the flask are then heated to 200° in the course of one hour, to 210° in the course of a further hour and to 220° in the course of a third hour. Heating is continued for a further 2 hours at 220°–225° and, lastly, a water-pump vacuum is applied at this temperature. As soon as a vacuum of 10–15 mm has been reached and maintained for ½-hour, the condensation reaction is completed. Approximately 15 more ml of water are collected in the receiver in the course of the second condensation phase. 732 g of an amber-coloured residue are obtained, which can readily be made up to 3,660 g with water and approximately 140 ml of 27% sodium hydroxide solution to give a pale, virtually clear 20% solution of pH 7. The molecular weight of the melt is 2,130; the apparent molecular weight of the sodium salt (on account of the dissociation effects which occur) is only 1,420, however.

If the final heating is carried out for less than ½-hour in vacuo at 220°–225°, a product with a lower molecular weight is obtained; on longer heating, however, a product with a higher molecular weight is obtained.

EXAMPLE 2

If an equivalent quantity of hemimellitic acid is used instead of TMA in Example 1, a product with correspondingly good properties is obtained.

EXAMPLE 3

If an equivalent quantity of a polyethylene glycol having a molecular weight of 300, 400, 1,000 or 2,000 is used instead of the polyethylene glycol in Example 1, products of somewhat modified properties are obtained, all of which are very suitable for use as levelling auxiliaries.

EXAMPLE 4

Desirable condensation products are obtained from the following mixtures components when condensed pursuant to the procedure of Example 1:

a. 50 mol percent of IPA; 30 mol percent of BA; 20 mol percent of TMA; 90 mol percent of DEG; 10 mol percent of PEG 600.

b. 50 mol percent of IPA; 30 mol percent of BA; 20 mol percent of TMA; 50 mol percent of DEG; 30 mol percent of 1,2-propylene glycol; 20 mol percent of PEG 400.

c. 50 mol percent of IPA; 30 mol percent of BA; 20 mol percent of TMA; 50 mol percent of TEG; 30 mol percent of monoethylene glycol; 20 mol percent of PEG 300.

d. 60 mol percent of IPA; 20 mol percent of phthalic anhydride; 20 mol percent of TMA; 95 mol percent of DEG; 5 mol percent of PEG 2000.

e. 70 mol percent of IPA; 10 mol percent of MA; 20 mol percent of TMA; 80 mol percent of DEG; 10 mol percent of hexane-1,6-diol; 10 mol percent of PEG 600.

EXAMPLE 5

373.5 g (90 mol percent) of IPA, 63 g (10 mol percent) of PMSA, 238.5 g (90 mol percent) of DEG, and 150 g (10 mol percent) of PEG 600 are reacted by the technique of Example 1. 732 g of an amber-colored residue are obtained, which can be readily made up to 3,690 g with water and approximately 74 ml of 27% sodium hydroxide solution to give a pale, virtually clear 20% solution of pH 6.3. The molecular weight of the melt is 2,070; the apparent molecular weight of the sodium salt (on account of the dissociation effects which occur) is only 1,460, however.

If potassium hydroxide solution, ammonia, monoethanolamine, diethanolamine or triethanolamine are used for neutralization instead of sodium hydroxide solution, products of correspondingly good technical properties are obtained, which differ greatly, however, in the viscosity of their 20% aqueous solutions.

EXAMPLE 6

80 mol percent of IPA; 20 mol percent of citric acid; 90 mol percent of DEG; 10 mol percent of PEG 600; MW = 1,710. These ingredients when reacted together according to the procedure of Example 1, yield 700 g of an amber-colored residue which can be readily made up to 3,500 g with water and approximately 60 ml of 27% sodium hydroxide solution to give an amber-solored, virtually clear 20% solution of pH 7.5. The apparent molecular weight of the solute is 1,710. A slight turbidity can, if necessary, be completely removed by stirring the 20% solution for half an hour with 35 g of kieselguhr (~1%) and forcing the product through a filter press.

If an equivalent quantity of tartaric acid or malic acid is employed instead of citric acid, a similar product is obtained, which is also very suitable for use as a levelling auxiliary in polyester dyeing.

EXAMPLE 7

4 mol percent of SIM; 76 mol percent of IPA; 20 mol percent of TMA; 100 mol percent of DEG; MW = 1,360.

159 g (1.5 mols) of diethylene glycol, 189.24 g (1.14 mols) of isophthalic acid of a purity of at least 99% and 17.76 g (0.06 mol) of 5-sodium-sulfo-isophthalic acid dimethyl ester are heated to 160° in the course of one hour under nitrogen and without the addition of a catalyst in a 2 l four-necked flask with ground glass joints, equipped with a stirrer, a thermometer, a gas inlet tube for nitrogen and a descending condenser. A wash bottle, which permits a convenient check on the rate of flow of the nitrogen, is placed downstream of the receiver. The temperature in the flask is then raised in the course of 3 hours by a further 20° per hour up to 220°. Heating is then continued for 2 hours at 220°–225°, at which time a total of about 43 g of water and methanol has distilled off. The internal temperature is now reduced to 150° and 57.6 g of trimellitic anhydride are stirred in in portions in the course of half an hour while continuing to pass nitrogen over the surface. The contents of the flask are then heated to 200° in the course of one hour and to 210° in the course of a further hour. Heating is continued for a further 2 hours at 210°–215° and, lastly, a waterpump vacuum is applied at this temperature. A half hour after a vacuum of 10–15 mm has been reached, the condensation reaction is completed. 8–10 ml of water are again collected in the receiver in the course of the second condensation phase. 365 g of an amber-colored residue are obtained, which can be readily made up to 1,820 g with water and approximately 50 ml of 27% sodium hydroxide solution to give a pale, virtually clear 20% solution of pH 6.85. The apparent molecular weight of this sodium salt is 1,360.

a. By varying the duration of heating at the waterpump, the degree of condensation (=the average apparent molecular weight) of the water-soluble polyester can be modified upwards or downwards.

b. If the sodium salt of 5-sulphoisophthalic acid dimethyl ester is replaced by an equivalent quantity of 5-potassium-sulpho-isophthalic acid, 5-sodium-sulpho-propoxy-isophthalic acid dimethyl ester, 4-sodium-sulphophthalic acid diethyl ester, 2-sodium-sulpho-terephthalic acid dipropyl ester, sodium sulphosuccinic acid dimethyl ester or either of the following two sodium salts of sulphonic acids:

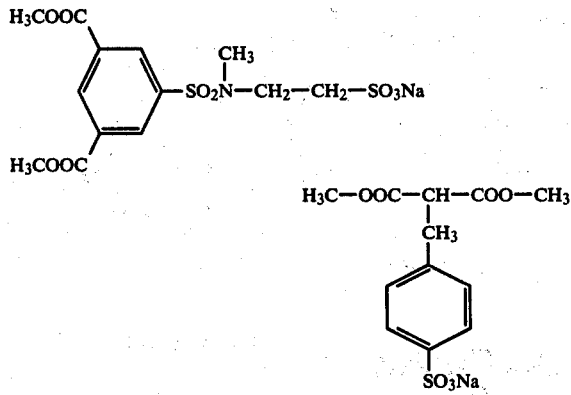

condensation products similar to the product of Example 7 are obtained.

c. If 50 mol percent of the diethylene glycol are replaced by an equivalent quantity of monoethylene glycol, 1,2-propylene glycol or ethylene-propylene diglycol, the condensation products obtained have in a 20% aqueous solution a viscosity somewhat higher than that of the product of Example 7.

d. If 40 mol percent of the diethylene glycol are replaced by an equivalent quantity of 1,3-propylene glycol or dipropylene glycol, condensation products are obtained which have physical and technical properties similar to those of Example 7c.

e. If 30 mol percent of the diethylene glycol are replaced by an equivalent quantity of butane-1,4-diol, hexane-1,6-diol, 1,3-dimethylol-cyclohexane or 1,4-dimethylol-cyclohexane, colloidally dispersed aqueous solutions are obtained which are also very suitable for use as levelling auxiliaries for polyester dyeings.

EXAMPLE 8

40 mol percent of IPA; 40 mol percent of DMI; 20 mol percent of TMA; 90 mol percent of DEG; 10 mol percent of PEG 600; MW=1,600.

238.5 g (2.25 mols) of diethylene glycol, 150 g (0.25 mol) of polyethylene glycol 600, 166 g (1 mol) of isophthalic acid of a purity of at least 99%, 194 g (1 mol) of isophthalic acid dimethyl ester and 2 g of titanium tetraisopropylate as the catalyst, are heated to 160° in the course of one hour under nitrogen in a 4 liter four-necked flask with ground glass joints, equipped with a stirrer, a thermometer, a gas inlet tube for nitrogen and a descending condenser. The temperature in the flask is then raised in the course of 3 hours by a further 20° per hour up to 220°. Heating is then continued for 2 hours at 220°–225°, after which a total of about 90–95 g of methanol and water had distilled off. The internal temperature is now reduced to 150° and 96 g (0.5 mol) of trimellitic anhydride are stirred in in portions in the course of half an hour while continuing to pass nitrogen over the surface. The contents of the flask are then heated to 200° in the course of one hour, to 210° in the course of a further hour and to 220° in the course of a third hour. Heating is continued for a further 2 hours at 220°–225° and lastly, a waterpump vacuum is applied at this temperature. A half hour after a vacuum of 10–15 mm has been reached, the condensation reaction is completed. Approximately 10 ml of water are again collected in the receiver in the course of the second condensation phase. 730 g of an amber-colored residue are obtained, which can be readily made up to 3,650 g with water and approximately 85 ml of 27% sodium hydroxide solution to give a pale, virtually clear 20% solution of pH 7.9. The molecular weight of the melt is 2,760; the apparent molecular weight of the sodium salt (on account of the dissociation effects which occur) is only 1,600, however.

EXAMPLE 8a

If in Example 8 the isophthalic acid dimethyl ester is replaced by an equivalent quantity of terephthalic acid dimethyl ester, a water-soluble polyester is obtained which is particularly suitable for use as a levelling auxiliary for dyeing polyester fibers.

EXAMPLE 9

If in Example 8 the isophthalic acid dimethyl ester is replaced by an equivalent quantity of phthalic acid dimethyl ester, succinic acid dimethyl ester or adipic acid dimethyl ester, desirable 20% aqueous condensate solutions are alco obtained.

EXAMPLE 10

80 mol percent of IPA; 20 mol percent of TMA; 100 mol percent of DEG; MW=1,340.

265 g (2.5 mols) of diethylene glycol, 332 g (2 mols) of isophthalic acid and 96 g (0.5 mol) of trimellitic anhydride are heated to 160° in the course of one hour under nitrogen and without the addition of a catalyst in a 4 liter four-necked flask with ground glass joints, equipped with a stirrer, a thermometer, a gas inlet tube for nitrogen and a descending condenser. The temperature in the flask is then raised in the course of 6 hours at 10° per hour up to 220°. Heating is then continued for a further hour at 220°-225° after which a total of about 80 g of water has distilled off, and a waterpump vacuum is applied at this temperature. A half hour after a vacuum of 10-15 mm has been reached, heating is terminated. 650 g of an amber-colored residue are obtained, which can be readily made up to 3,300 g with water and approximately 60 ml of concentrated aqueous ammonia to give a pale, but very viscous, 20% solution of pH 7. Its (apparent) molecular weight is approximately 1,340.

EXAMPLE 11

A liquor which has been prepared from soft water with a pH of 4.5 (adjusted with acetic acid) and 0.5 g of a branched, water-soluble copolyester according to Example 1 is allowed to flow at 130° C. and at a liquor ratio of 1:10 through wound skeins (muffs) of texturized polyester yarns in a HT dyeing apparatus.

This liquor is added rapidly by means of an injection apparatus to a mixture, predispersed with water at 40° C., of the following disperse dyes in their commercially available form:

0.46% of the dye

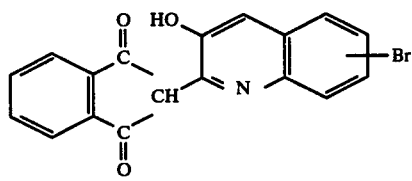

0.52% of the dye

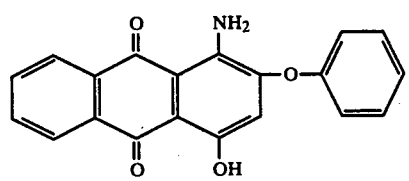

0.17% of the dye which is composed of equal parts

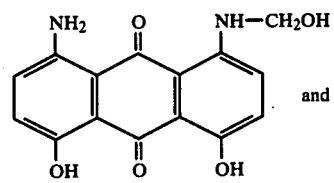

and

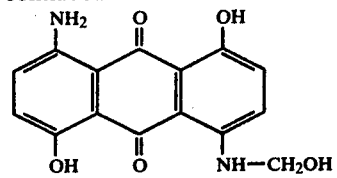

The quantity of liquor-dye mixture which flows through the muffs is 20 l/kg per minute. After 30 minutes treatment at 130° C. the batch is cooled, circulation is stopped, the residual liquor is discharged, and the goods are cleared by reduction.

A completely level brown dyeing is obtained at a full tinctorial yield.

If the same dyeing is carried out with the same dyes and under the same conditions, but without adding the water-soluble, branched copolyester and using instead a commercially available naphthalene-sulphonic acid/formaldehyde condensate dispersing auxiliary or a levelling auxiliary consisting of a mixture of fatty acid polyglycol ester, polyglycol and oxethylated alkylphenols, an uneven dyeing is obtained which has great differences in the depth of color and in the color shades of the individual muffs.

EXAMPLE 12

The procedure of Example 11 is duplicated but with the condensate of Example 2 used in place of that of Example 1. Dyeing for 30 minutes at 130° C. yields a completely level brown dyeing.

If in this dyeing the levelling agent is replaced by the naphthalenesulfphonic acid/formaldehyde dispersing auxiliary or the fatty acid polyglycol ester, polyglycol and oxethylated alkylphenols mixture, an uneven dyeing is obtained.

EXAMPLE 13

The dyeing is carried out by following the procedure described in Example 11, but using 0.4% of the disperse dye

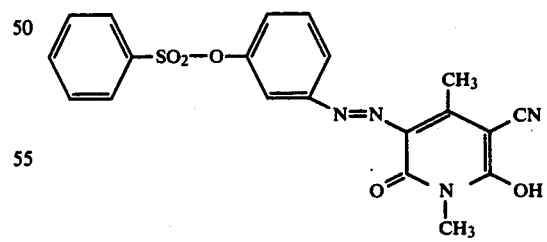

0.32% of the disperse dye

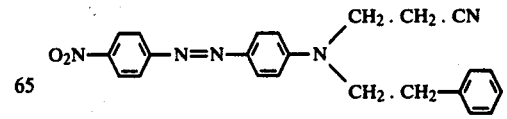

and 0.26% of the dye

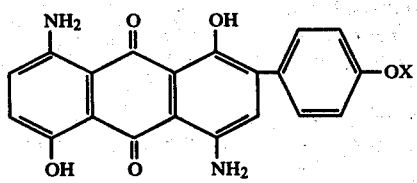

where X=40% —H; 60% —CH₃.

Dyeing is carried out for 25 mins. at 130° C., a reductive after-treatment is carried out and a level brown dyeing is obtained. If in this dyeing the levelling agent is replaced by commercially available dispersing and levelling auxiliaries, an uneven dyeing which has great differences in depth of color and color shade is obtained.

EXAMPLE 14

(a) A dyeing liquor which consists of soft water adjusted to pH 5 with acetic acid and having dissolved in it 0.5 g/l of sodium 2,2'-dinaphthylmethane-6,6'-disulphonate is allowed to flow, at 80° C. and at a liquor ratio of 1:;2, through wound muffs of texturized polyester threads in a HT dyeing apparatus.

1.5%, based on the weight of the goods, of the disperse dye

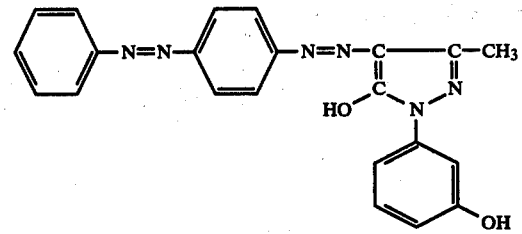

in its commercially available form are added to this liquor. The dyebath is heated to 130° C. in the course of 40 minutes and dyeing is carried out at this temperature for 30 minutes. The goods are then given a hot rinse and a reductive after-treatment, but the resulting dyed product does not meet commercial standards.

(b) If in the dyeing described above the sodium 2,2'-dinaphthylmethane-6,6'-disulphonate is replaced by 0.3 g/l of the condensate of Example 8a and the procedure followed is exactly as described above, a level, golden-yellow dyeing is obtained, which is fast to rubbing and does not have deposits on the dyed goods.

The dye of this example has hitherto not been commercially usable for dyeing wound packages, but can be employed without difficulties with the help of the present invention.

EXAMPLE 15

The procedure followed is as described in Example 14 (b), but using 2% of the red disperse dye

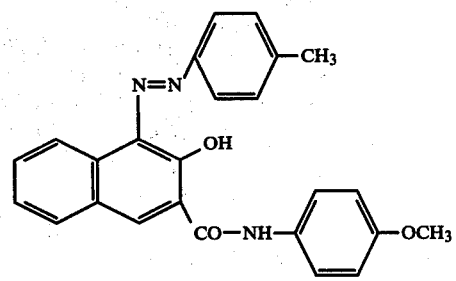

in a liquid preparation which has hitherto not been suitable for dyeing wound goods, using 0.7 g/l of the condensate of Example 5.

A level, brilliant scarlet dyeing which is fast to rubbing is obtained.

If the same dyeing is carried out with the levelling agent replaced by a commercially available dispersing agent condensed from formaldehyde and cresol, an unusable, uneven, flat dyeing is obtained, which is not fast to rubbing owing to loosely deposited dye particles.

EXAMPLE 16

Dyeing is carried out by following the procedure of Example 11, but using the dye of Example 15. A vivid, level scarlet dyeing is obtained which is fast to rubbing.

If the levelling agent of Example 11 is replaced by the commercially available dispersing agent referred to in Example 11, an uneven dyeing is obtained, which is not fast to rubbing and is contaminated by dye filtered off on the goods.

Obviously many modifications and variations of the present invention are possible in the light of the above teachings. It is, therefore, to be understood that within the scope of the appended claims the invention may be practiced otherwise than as specifically described.

What is claimed:

1. In the process for dyeing a textile polyester fiber article with an aqueous dispersion of at least one water-insoluble disperse dyestuff which dispersion contains in addition to said dyestuff a levelling agent that reduces the tendency of said fibrous article to be unevenly dyed, dispersed itself in water, wherein the improvement comprises said levelling agent being a water-soluble or dispersible branched polyester which has an apparent average molecular weight of from about 600 to about 5,000 and is the esterification reaction product of
 (a) dicarboxylic acid;
 (b) diol comprising at least 40 mole percent of diethylene glycol, triethylene glycol or a mixture thereof; and
 (c) a branching component selected from the group consisting of polycarboxylic acid having 3 to 5 carboxyls, polyol having 3 to 5 hydroxyls and hydroxycarboxylic acid having at least one carboxyl and at least one hydroxyl with the sum carboxyl and hydroxyl being 3 to 5, the amount of branching component being sufficient to produce a polyester having 5 to 40 mole percent branching components;
with the proviso that the polyester contains, relative to the number of moles of carboxylic acid units esterified in the polyester, from about 5 to about 50 mole percent of nonesterified —COOH or —COOM groups and less than 5 mole percent of —SO₃M, wherein M is alkali metal ion, ammonium ion or an organic amine cation.

2. The process of claim 1, wherein in the polyester used as levelling agent about 10 to about 30 mol.% COOH or COOM groups are present relative to the total number of carboxylic acid units.

3. The process of claim 1 wherein in the polyester used as levelling agent M is the sodium cation.

4. The process of claim 1, wherein in the polyester used as levelling agent at least about 80 mol.% of the diol units being originated from diethylene glycol, triethylene glycol or mixtures thereof.

5. The process of claim 1, wherein in the polyester used as levelling agent at least 40 mol.% of the carboxylic acid units are phthaloyl groups.

6. The process of claim 1, wherein the polyester used as levelling agent at least 40 ml.% of the carboxylic acid units are isophthaloyl groups.

7. The process of claim 1, wherein the polyester used as levelling agent the number of branches on an interesterified group being not over two.

8. In an aqueous dye liquor having dispersed therein at least one water-insoluble disperse dyestuff and a levelling agent that causes said liquor to more evenly dye a textile polyester fiber article, wherein the improvement comprises said levelling agent being a branched water-soluble or dispersible polyester which has an apparent average molecular weight of from about 600 to about 5,000 and is the esterification reaction product of
(a) dicarboxylic acid;
(b) diol comprising at least 40 mole percent of diethylene glycol, triethylene glycol or a mixture thereof; and
(c) a branching component selected from the group consisting of polycarboxylic acid having 3 to 5 carboxyls, polyol having 3 to 5 hydroxyls and hydroxycarboxylic acid having at least one carboxyl and at least one hydroxyl with the sum carboxyl and hydroxyl being 3 to 5, the amount of branching component being sufficient to produce a polyester having 5 to 40 mole percent branching components;

with the proviso that the polyester contains, relative to the number of moles of carboxylic acid units esterified in the polyester, from about 5 to about 50 mole percent of nonesterified —COOH or —COOM groups and less than 5 mole percent of —SO₃M, wherein M is alkali metal ion, ammonium ion or an organic amine cation.

9. The dye liquor of claim 8, wherein in the polyester used as levelling agent—relative to the number of carboxylic acid units—about 10 to about 30 mol.% COOM groups are present.

10. The dye liquor of claim 8, wherein in the polyester used as levelling agent M is the sodium cation.

11. The dye liquor of claim 8, wherein in the polyester used as levelling agent at least about 80 mol.% of the diol united being originated from diethylene glycol, triethylene glycol or mixtures thereof.

12. The dye liquor of claim 8, wherein in the polyester used as levelling agent at least 40 mol.% of the carboxylic acid units are phthaloyl groups.

13. The dye liquor of claim 8, wherein the polyester used as levelling agent at least 40 mol.% of the carboxylate acid units are isophthaloyl groups.

14. The dye liquor of claim 8, wherein in the polyester used as levelling agent the number of branches on an interesterified group being not over two.

* * * * *